United States Patent
Yamashita et al.

(10) Patent No.: US 10,932,217 B2
(45) Date of Patent: Feb. 23, 2021

(54) NETWORK SERVICE OVER LIMITED NETWORK CONNECTIVITY

(71) Applicant: Uber Technologies, Inc., San Francisco, CA (US)

(72) Inventors: Yuhki Yamashita, San Francisco, CA (US); Didier Patrick Hilhorst, San Francisco, CA (US); Shamit Patel, San Francisco, CA (US); Minh Pham, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 53 days.

(21) Appl. No.: 16/582,275

(22) Filed: Sep. 25, 2019

(65) Prior Publication Data

US 2020/0022101 A1 Jan. 16, 2020

Related U.S. Application Data

(63) Continuation of application No. 15/395,746, filed on Dec. 30, 2016, now Pat. No. 10,477,504.

(Continued)

(51) Int. Cl.
*H04M 1/00* (2006.01)
*H04W 60/00* (2009.01)
(Continued)

(52) U.S. Cl.
CPC ........... *H04W 60/005* (2013.01); *H04W 4/12* (2013.01); *H04W 36/0066* (2013.01);
(Continued)

(58) Field of Classification Search
CPC . H04W 60/005; H04W 4/12; H04W 36/0066; H04W 84/042; H04W 84/12; H04W 88/06; H04W 36/26; H04W 36/14
(Continued)

(56) References Cited

U.S. PATENT DOCUMENTS 7,024,205 B1    4/2006  Hose
7,519,916 B1 *  4/2009  Hartwell ................. H04L 47/10
                                          715/771

(Continued)

FOREIGN PATENT DOCUMENTS

| CA | 2975002 | 8/2016 |
|---|---|---|
| WO | WO 2010142862 | 12/2010 |
| WO | WO2011/132181 | 10/2011 |

OTHER PUBLICATIONS

Borison, Rebecca, "Uber Brings its SUV Fleet to NYC", Jul. 30, 2014, Business Insider, p. 1.

(Continued)

*Primary Examiner* — April G Gonzales
(74) *Attorney, Agent, or Firm* — Mahamedi IP Law LLP (57) ABSTRACT

A method and system for controlling a data transmission for a network-based service over limited network connectivity are described. A computing device detects that it has insufficient network connectivity to transmit a data message from a service requester application executing on the computing device to a server using a data communications channel. The computing device receives user input for a request for service and transmits the request for service to the server via an alternate communications channel. The server receives and processes the request to arrange for service for the user and transmits data corresponding to a service arrangement to the computing device over the alternate communications channel.

20 Claims, 6 Drawing Sheets

Related U.S. Application Data (60) Provisional application No. 62/399,770, filed on Sep. 26, 2016.

(51) Int. Cl.

| | | |
|---|---|---|
| *H04W 36/26* | (2009.01) | |
| *H04W 4/12* | (2009.01) | |
| *H04W 36/00* | (2009.01) | |
| *H04W 36/14* | (2009.01) | |
| *H04W 84/04* | (2009.01) | |
| *H04W 84/12* | (2009.01) | |
| *H04W 88/06* | (2009.01) | |

(52) U.S. Cl.
CPC ............ *H04W 36/26* (2013.01); *H04W 36/14* (2013.01); *H04W 84/042* (2013.01); *H04W 84/12* (2013.01); *H04W 88/06* (2013.01)

(58) Field of Classification Search
USPC .............................................. 455/552.1, 466
See application file for complete search history.

(56) References Cited

U.S. PATENT DOCUMENTS

| | | | | |
|---|---|---|---|---|
| 9,197,696 | B1* | 11/2015 | Jakatdar ................ | H04L 67/10 |
| 9,922,469 | B1* | 3/2018 | Ashton ................... | G07C 5/08 |
| 9,976,863 | B2* | 5/2018 | Dryjanski .............. | G08G 1/202 |
| 9,990,655 | B2* | 6/2018 | MacTiernan ....... | G06Q 30/0269 |
| 2002/0034292 | A1* | 3/2002 | Tuoriniemi .......... | G01S 5/0027 |
| | | | | 379/219 |
| 2004/0198366 | A1 | 10/2004 | Crocker | |
| 2004/0202132 | A1 | 10/2004 | Heinonen | |
| 2005/0177799 | A1* | 8/2005 | Knight .................. | G06F 9/451 |
| | | | | 715/810 |
| 2006/0059023 | A1* | 3/2006 | Mashinsky ............ | G06Q 10/02 |
| | | | | 705/5 |
| 2007/0011233 | A1* | 1/2007 | Manion ............... | H04L 12/1822 |
| | | | | 709/204 |
| 2009/0113296 | A1* | 4/2009 | Lacy .................. | G01C 21/3682 |
| | | | | 715/700 |
| 2009/0113696 | A1* | 5/2009 | Holmes ................. | H02K 15/12 |
| | | | | 29/596 |
| 2010/0179750 | A1* | 7/2010 | Gum .................... | G01C 21/362 |
| | | | | 701/533 |
| 2011/0099040 | A1* | 4/2011 | Felt ....................... | G08G 1/202 |
| | | | | 705/7.12 |
| 2011/0016862 | A1 | 7/2011 | Eshed | |
| 2011/0166862 | A1* | 7/2011 | Eshed .................... | G10L 15/30 |
| | | | | 702/270 |
| 2011/0238289 | A1* | 9/2011 | Lehmann ........... | G01C 21/3617 |
| | | | | 701/533 |
| 2012/0311584 | A1 | 12/2012 | Gruber | |
| 2013/0036117 | A1* | 2/2013 | Fisher .................. | G06F 16/487 |
| | | | | 707/736 |
| 2013/0090950 | A1* | 4/2013 | Rao ..................... | G06Q 30/0613 |
| | | | | 705/4 |
| 2013/0132140 | A1* | 5/2013 | Amin ................... | G06Q 10/06 |
| | | | | 705/7.13 |
| 2013/0138723 | A1* | 5/2013 | Ku ....................... | G06F 3/04817 |
| | | | | 709/203 |
| 2013/0246301 | A1* | 9/2013 | Radhakrishnan .. | G06Q 30/0282 |
| | | | | 705/347 |
| 2013/0268406 | A1* | 10/2013 | Radhakrishnan .. | G06Q 30/0283 |
| | | | | 705/26.61 |
| 2013/0311997 | A1 | 11/2013 | Gruber T | |
| 2014/0082069 | A1 | 3/2014 | Varoglu | |
| 2014/0164525 | A1 | 6/2014 | Malik | |
| 2014/0195972 | A1* | 7/2014 | Lee ..................... | G06F 3/04817 |
| | | | | 715/811 |
| 2014/0221006 | A1* | 8/2014 | Jhanji .................. | H04W 4/029 |
| | | | | 455/456.1 |
| 2014/0364150 | A1* | 12/2014 | Marti .................... | H04W 64/00 |
| | | | | 455/456.3 |
| 2015/0012341 | A1 | 1/2015 | Amin | |
| 2015/0039368 | A1* | 2/2015 | Polyakov ........... | G06Q 10/1095 |
| | | | | 705/7.19 |
| 2015/0099461 | A1* | 4/2015 | Holden ................ | G01C 21/367 |
| | | | | 455/39 |
| 2015/0161564 | A1* | 6/2015 | Sweeney .......... | G06Q 10/06311 |
| | | | | 705/338 |
| 2015/0248689 | A1* | 9/2015 | Paul .................... | G06O 30/0222 |
| | | | | 705/14.23 |
| 2016/0006702 | A1* | 1/2016 | Chestnut ................ | H04L 51/28 |
| | | | | 713/168 |
| 2016/0026936 | A1 | 1/2016 | Richardson | |
| 2016/0027306 | A1 | 1/2016 | Lambert | |
| 2016/0048804 | A1* | 2/2016 | Paul ................. | G06O 10/08355 |
| | | | | 705/338 |
| 2016/0069694 | A1 | 3/2016 | Tao | |
| 2016/0105787 | A1* | 4/2016 | Hammer ............. | H04L 41/5067 |
| | | | | 370/328 |
| 2016/0140789 | A1 | 5/2016 | Wickersham, III | |
| 2016/0165510 | A1 | 6/2016 | Jun | |
| 2016/0171584 | A1* | 6/2016 | Cao .................... | G06O 30/0282 |
| | | | | 705/26.62 |
| 2016/0203522 | A1* | 7/2016 | Shiffert ................. | H04W 4/021 |
| | | | | 705/14.58 |
| 2016/0300318 | A1 | 10/2016 | Godil | |
| 2017/0013408 | A1* | 1/2017 | Grzywaczewski .... | G01C 21/28 |
| 2017/0052034 | A1 | 2/2017 | Magazinik | |
| 2017/0126837 | A1 | 5/2017 | Wang | |
| 2017/0132540 | A1 | 5/2017 | Haparnas | |
| 2017/0147951 | A1* | 5/2017 | Meyer ................... | G06Q 10/02 |
| 2017/0169366 | A1* | 6/2017 | Klein .................... | G06Q 50/30 |
| 2017/0191842 | A1 | 7/2017 | Magazinik | |
| 2017/0193458 | A1* | 7/2017 | Marco ............... | G06Q 10/1097 |
| 2017/0220966 | A1 | 8/2017 | Wang | |
| 2017/0357408 | A1* | 12/2017 | Anglin ................. | H04W 4/029 |
| 2018/0089784 | A1* | 3/2018 | Yamashita ............. | G06Q 10/00 |
| 2018/0091604 | A1* | 3/2018 | Yamashita ............. | G06Q 50/30 |
| 2018/0092057 | A1* | 3/2018 | Yamashita ............. | H04W 4/12 |
| 2018/0315021 | A1* | 11/2018 | Bijor ................... | G06Q 10/1093 |
| 2019/0050775 | A1* | 2/2019 | Bijor ....................... | H04L 67/34 |
| 2019/0306258 | A1 | 10/2019 | Yamashita | |

OTHER PUBLICATIONS

Hilen, Brittany, Uber and Google bring WIFI to cars in Philadelphia, Slashgear, dated Jul. 24, 2014, p. 1, https://web.archive.org/web/20140724201314/http://www.slashgear.com/uber-and-google-bring-wifi-to-cars-in-philadelphia-22338326.

ISR and Written Opinion in PCT/US2017/053469 dated Dec. 8, 2017.

Cody Toombs: Maps v.9.19 Introduces New 'Driving Mode' with Traffic Update and ETAs, Audio Toggle for Navigation, and Timeline Seetings [APK Download and Teardown], Jan. 12, 2016 URL: http://www.androidpolice. Com/2016/01/12/maps-v9-19 -introduces - new-driving-mode-with-traffic-updates -and-etas-audio-toggle-for- navigation- and-timeline-seetings-apk-download-teardown/.

Darrell Etherington: "Google Maps on Mobile Gets Uber Integration and More", May 6, 2014 URL: https//techcrunch.com /2014/05/06/google-maps-on-mobile- gets-uber-integration-and-more.

EESR issued in EP 16735494.3 dated May 18, 2018.

ISR and Written Opinion issued Jan. 11, 2018 in PCT/US2017/053514.

ISR and Written Opinion in PCT/US2018/046496 dated Nov. 28, 2019.

McLaren, Sharing Cities, MIT Press, 2015, pp. 21-69.

Edelman, Computing the Mind, Oxford University Press, 2008, pp. xi-36.

Wirth, Algorithms + Data Structures = Programs, 1976, pp. xii-55.

Lakoff, Metaphors We Live by, University of Chicago Press, 1980, pp. ix-55.

Goffman, Frame Analysis, Northeastern University Press, 1974, pp. 1-39, 301-344.

Gupta, Inside Bluetooth Low Energy, Artech House, 2013, pp. 119-130.

(56) References Cited

OTHER PUBLICATIONS

Written Opinion in PCT/US2018/046496 dated Aug. 5, 2019.

* cited by examiner

FIG. 4A
App Interface 410

FIG. 4B
SMS Confirmation Screen 420

SMS Receiving Screen 430

Limited Connectivity Map 440

NETWORK SERVICE OVER LIMITED NETWORK CONNECTIVITY

RELATED APPLICATIONS

This application is a continuation of U.S. patent application Ser. No. 15/395,746, filed Dec. 30, 2016, which claims benefit of priority to U.S. Provisional Application No. 62/399,770, filed Sep. 26, 2016; the aforementioned priority applications being hereby incorporated by reference in their entireties.

BACKGROUND

User-centric network services typically sequence users through a number of selection interfaces so that the user can specify certain information for a desired type of service, including service level selections and preferences. With enhancements in network and mobile technology, the number of services for user selection is also increasing, creating inconvenience for human operators. Moreover, the time needed for selection can occupy an interface device, creating performance issues and draining resources of the operative selection device.

DETAILED DESCRIPTION

A network computer system is provided herein that manages an on-demand network-based service linking available service providers with service requesters throughout a given region (e.g., a metroplex such as the San Francisco Bay Area). In doing so, the network computer system can receive service requests for on-demand services from requesting users via a designated service requester application executing on the users' mobile computing devices. Based on a service location, the network computer system can identify a number of proximate available service providers and transmit a service invitation to one or more service provider devices of the proximate available service providers to fulfil the service request. In many examples, the service providers can either accept or decline the invitation based on, for example, the service location being impractical for the service provider.

In selecting a service provider to fulfil a given service request, the network computer system can identify a plurality of candidate service providers to fulfil the service request based on a service location indicated in the service request. For example, the network computer system can determine a geo-fence surrounding the service location (or a geo-fence defined by a radius away from the service location), identify a set of candidate service providers (e.g., twenty or thirty service providers within the geo-fence), and select an optimal service provider (e.g., closest service provider to the service location, service provider with the shortest estimated travel time from the service location, service provider traveling to a location within a specified distance or specified travel time to the destination location, etc.) from the candidate service providers to fulfil the service request. According to examples provided herein, the network computer system can compile historical data for individual service requesters with regard to the network-based service. Thus, the network computer system can manage a service requester profile for each service requester indicating routine start and/or end locations (or regions), and/or routine routes (e.g., for a transportation service from home to work and/or vice versa) and preferred service types (e.g., transportation, delivery, mailing, etc.). In some examples, the network computer system can further synchronize with a service requester device to, for example, identify the service requester's contacts, the service requester's schedule and appointments, travel plans (e.g., a scheduled trip), and the like.

In various implementations, the network computer system and service requester application running on a service requester device can establish a set of criteria to determine whether to display low bandwidth versions of interface screens on the service requester device in limited network connectivity scenarios. In addition, when Internet network connectivity (e.g., through cellular data networks or Wi-Fi) is not present or otherwise unreliable, the service requester application can operate in a limited network connectivity or bandwidth mode (as opposed to a default mode, for example) to send and receive a simple message system (SMS) text messages containing information necessary to request and establish a service arrangement through the network computer system.

Conventional service requester applications used with on-demand service systems rely on transmitting and receiving encoded data using various application programming interfaces over cellular and Wi-Fi connections to the Internet (e.g., communications using a data network). However, in low bandwidth situations common in remote areas, developing countries, or periods of high usage, for example, application features such as detailed map data or detailed user interface features can require more than the available bandwidth to properly display in a timely manner. In addition, in situations where no network connectivity is present, conventional service applications are limited in their functionality. Among other benefits, providing on-demand services over limited network connectivity allows a user to request service and receive progress updates in places with low bandwidth, an unreliable connection, or no Internet connection at all.

According to examples described herein, a computing device (or application running on the computing device) detects that it has insufficient network connectivity to transmit a request for service from a service requester application executing on the computing device to a server and transmits the request for service to the server via an alternate communications channel. The server receives and processes the request to arrange for service for the user and transmits details regarding a service arrangement to the computing device over the alternate communications channel.

In some aspects, the computing device receives the details regarding the service arrangement over the alternate communications channel, parses the details into a format compatible with the service requester application, and displays the parsed details on the computing device.

In some examples, the alternate communications network uses the short message service (SMS), which relies on a voice network and can be transmitted without using a data network. Additionally, the service requester application displays in a low fidelity format upon detecting that the computing device has limited network connectivity, and the service requester application caches map details on the computing device and displays the cached map details upon detecting that the computing device has limited network connectivity.

Further, the computing device transmits the request for service to the server via the alternate communications channel upon receiving a confirmation from the user on the service requester application.

In one aspect, the service requester application automatically sends and receives messages over the alternate communications channel. In another aspect, the service requester application launches a separate application to communicate over the alternate communications channel and populates a message window in the separate application for the user to send on behalf of the service requester application.

As provided herein, the terms "user" and "service requester" may be used throughout this application interchangeably to describe a person who utilizes a requester application on a computing device to request, over one or more networks, on-demand services from a network computing system. The term "service provider" may be used to describe a person or autonomous entity (e.g., an autonomous vehicle) utilizing a provider application on a computing device to provide on-demand services.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

Figure 1:
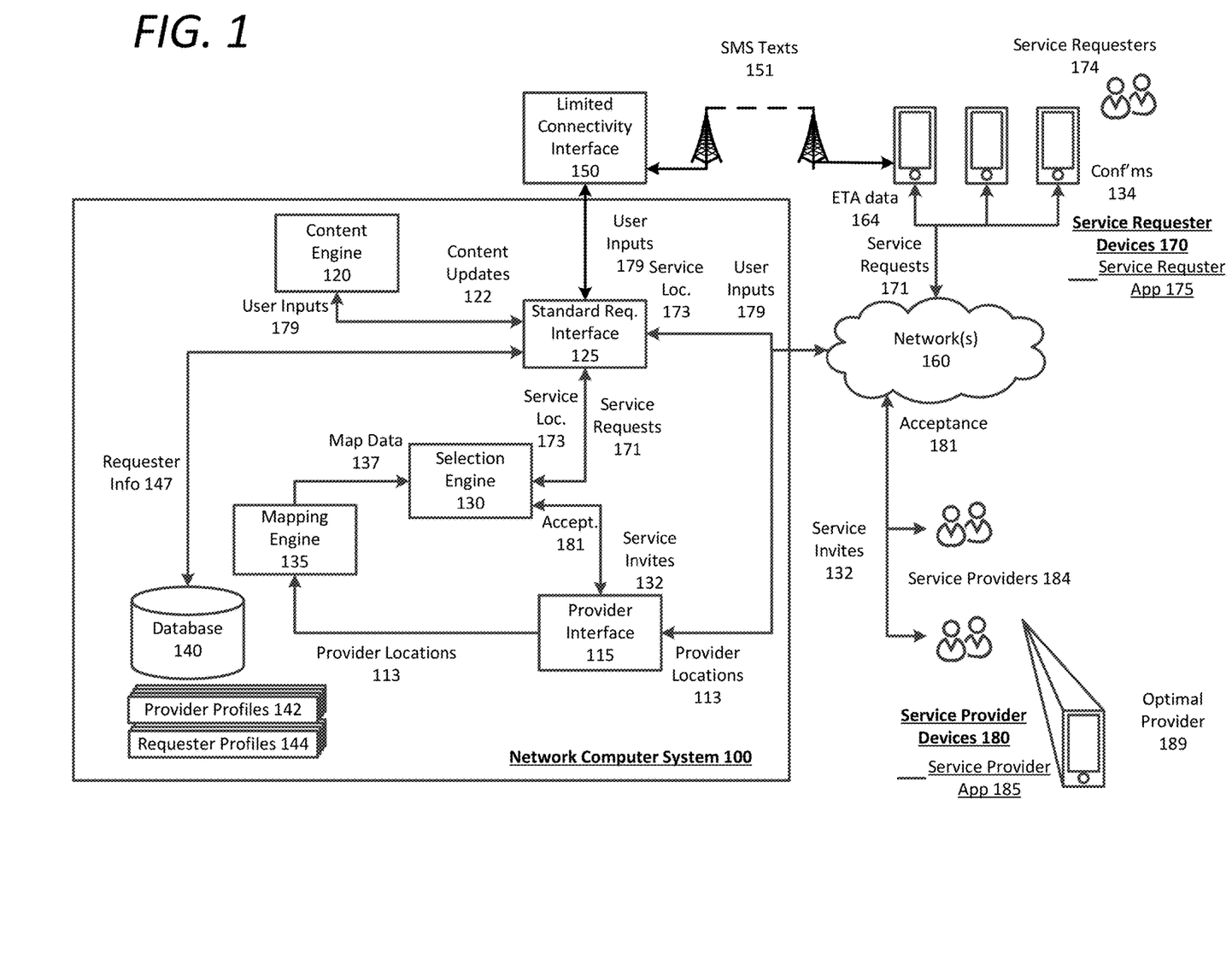
FIG. 1 is a block diagram illustrating an example network computer system in communication with service requester and service provider devices, in accordance with examples described herein.

FIG. 1 is a block diagram illustrating an example network computer system in communication with service requester and service provider devices, in accordance with examples described herein. The network computer system 100 can implement or manage a service arrangement service that connects requesting users or service requesters 174 with service providers 184 that are available to fulfil the users' 174 service requests 171. The network computer system 100 can provide a platform that enables sharing services between requesters 174 and available service providers 184 by way of a service requester application 175 executing on the service requester devices 170, and a service provider application 185 executing on the service provider devices 180. As used herein, a service requester device 170 and a service provider device 180 can comprise a computing device with functionality to execute a designated application corresponding to the arrangement service managed by the network computer system 100. In many examples, the service requester device 170 and the service provider device 180 can comprise mobile computing devices, such as smartphones, tablet computers, VR or AR headsets, on-board computing systems, and the like. Example on-demand network-based services can comprise on-demand delivery, package mailing, shopping, construction, plumbing, home repair, housing or apartment sharing, etc., or can include transportation arrangement services implementing a ride sharing platform.

The network computer system 100 can include a standard service requester interface 125 to communicate with service requester devices 170 over one or more networks 160 (e.g., the Internet) via a service requester application 175. According to examples, a requesting requester 174 wishing to utilize the service arrangement service can launch the service requester application 175 and transmit a service request 171 over the network 160 to the network computer system 100. In certain implementations, the requesting service requester 174 can view multiple different service types managed by the network computer system 100, such as ride-pooling, a basic ride share service type, a luxury vehicle service type, a van or large vehicle service type, a professional driver service (e.g., where the driver is certified), a self-driving vehicle transport service, and the like. The network computer system 100 can utilize the service provider locations 113 to provide the service requester devices 170 with estimated time to arrival (ETA) data 164 of proximate service providers for each respective service. For example, the service requester application 175 can enable the requester 174 to scroll through each service type. In response to a soft selection of a particular service type, the network computer system 100 can provide ETA data 164 on a user interface of the service requester application 175 that indicates an ETA of the closest provider for the service type, and/or the locations of all proximate available service providers for that service type. As the user scrolls through each service type, the user interface can update to show visual representations of service providers for that service type on a map centered around the requester 174 or a service location 173 set by the user. The user can interact with the user interface of the service requester application 175 to select a particular service type and transmit a service request 171.

In some examples, the service request 171 can include a service location 173 within a given region (e.g., a metropolitan area managed by one or more datacenters corresponding to the network computer system 100) in which a matched service provider is to rendezvous with the service requester 174. The service location 173 can be inputted by the user by setting a location pin on a user interface of the service requester application 175, or can be determined by a current location of the service requester 174 (e.g., utilizing location-based resources of the service requester device 170). Additionally, the service requester 174 can further input a destination during or after submitting the service request 171.

In various implementations, the network computer system 100 can further include a selection engine 130 to process the service requests 171 in order to ultimately select service providers 184 to fulfil the service requests 171. The network computer system 100 can include a service provider device interface 115 to communicate with the service provider devices 180 via the service provider application 185. In accordance with various examples, the service provider devices 180 can transmit their current locations using location-based resources of the service provider devices 180 (e.g., GPS resources). These service provider locations 113 can be utilized by the selection engine 130 to identify a set of candidate service providers 184, in relation to the service location, that can service the service request 171.

In certain implementations, the network computer system 100 can also select a proximate autonomous entity (e.g., a self-driving vehicle (SDV)) to fulfil the service request 171. Thus, the pool of proximate candidate service providers in relation to a service location 173 can also include one or more SDVs operating throughout the given region.

In some aspects, the network computer system 100 can include a mapping engine 135, or can utilize a third-party mapping service, to generate map data 137 and or traffic data in the environment surrounding the service location 173. The mapping engine 135 can receive the service provider locations 113 and input them onto the map data 137. The selection engine 130 can utilize the current locations 113 of the service providers in the map data 137 (e.g., by setting a geo-fence surrounding the service location) in order to select an optimal provider 189 to fulfil the service request 171. As provided herein, the optimal provider 189 can be a service provider that is closest to the service requester 174 with respect to distance or time, or can be a proximate service provider that is optimal for other reasons, such as the service provider's experience, the amount of time the service provider has been on the clock, the service provider's current earnings, and the like.

Once the optimal provider 189 is selected, the selection engine 130 can generate a service invitation 132 to fulfil the service request 171, and transmit the service invitation 132 to the optimal service provider's device via the service provider application 185. Upon receiving the service invitation 132, the optimal provider 189 can either accept or reject the invitation 132. Rejection of the invitation 132 can cause the selection engine 130 to determine another optimal service provider from the candidate set of service providers 184 to fulfil the service request 171. However, if the optimal service provider accepts (e.g., via an acceptance input), then the acceptance input can be transmitted back to the selection engine 130, which can generate and transmit a confirmation of the optimal provider 189 to the service requester 174 via the service requester application 175 on the service requester device 170.

According to examples provided herein, the network computer system 100 can include a content engine 120 that manages the manner in which content is displayed on the service requester devices 170 and/or the service provider devices 180. Regarding the service requester devices 170, the content engine 120 can provide content updates based on user inputs 179 on a user interface generated by the service requester application 175. For example, a user selection on a content feature of the service requester application 175 can cause the content engine 120 to generate a new screen on the service requester application 175, or cause a current screen to pivot between certain displayed features. When inputting a particular service location, the user may utilize a location pin and map content, and set the location pin on a particular location in the map content to input the service location. Additionally, the content engine 120 can cause a service location input box to overlay the map content, which can enable the service requester 174 to select the input box to cause additional features to be displayed on the user interface (e.g., overlaying the map content). In variations, to return to the map content, the service requester 174 can input a gesture—such as a scroll or swipe gesture—anywhere on the screen. In response to the gesture, the content engine 120 can cause the additional features to dismiss, and re-enable map content scrolling with the location pin. These dynamically pivoting interfaces can be provided by the content engine 120 for the service location input, the destination location input, or both.

In various implementations, the network computer system 100 can further include a database 140 storing service requester profiles 144 specific to the individual requesters 174 of the on-demand service. Such information 147 can include user preferences of service types, routine routes, service locations, work addresses, home addresses, addresses of frequently visited locations (e.g., a gym, grocery store, mall, local airport, sports arena or stadium, concert venue, local parks, and the like). In addition, the database 140 can further store service provider profiles 142 indicating information specific to individual service providers 184, such as vehicle type, service qualifications, earnings data, and experience. The database 140 can also store historical data regarding service requester and service provider liquidity for a given area, that is, how often a new service provider 184 is expected to make themselves available for network-based services in the area.

In some aspects, the service requester application 175 on service requester device 170 can operate in a limited network connectivity mode (e.g., in which visual features of the user interfaces are degraded, data is transmitted using an alternative communication method, etc.) as opposed to a default or normal mode upon detecting that data throughput over network 160 is insufficient to provide the necessary data to the service requester device 170 in a timely manner. For example, updating detailed map data 137 can require sending large amounts of data through network 160 from the standard service requester interface 125 to the service requester device 170. If the connection to network 160 does not support sufficient bandwidth, the service requester application 175 can present important information such as ETA data 164 and confirmations 134 on user interfaces with low fidelity map tiles or blank maps. During normal operation, the service requester application 175 can monitor network conditions over network 160 and switch between a regular high-bandwidth mode and the low-bandwidth alternative in response to changes in network connectivity and measured throughput. In some examples, the service requester application 175 can selectively cache map information when network conditions are favorable and fall back on this cached information in limited network conditions.

In situations where service requester device 170 has no connection to network 160, has low Internet connectivity to network 160 or low bandwidth (e.g., network speed is less than a threshold value, or data throughput in bits per second are less than a threshold value, etc.), or network conditions are unreliable (e.g., intermittent connectivity), for example, the service requester application 175 can operate in the limited network connectivity mode to generate and send service requests 171 using an alternate communications channel, such as the short message system (SMS). SMS text messages 151 (also referred to herein as texts 151 for simplicity) are sent from the service requester device 170 to a limited connectivity interface 150 as part of the network computer system 100. These text messages can include similar information as would normally be sent over network 160 to the standard service requester interface 125 (but may be structured in a different data format, for example). In one example, a service request 171 from an individual requester 174 can specify a user identifier (ID) and a service location 173. In some variations, the service request 171 specifies a service type, and/or any additional parameters that may be required or optional for the specified service type. The service location 173 can correspond to, for example, the current location of the service requester device 170 (e.g., as a default setting), a future location of the service requester device 170, and/or a location specified by manual input from the requester 174. In some examples, limited connectivity interface 150 can treat the phone number of a received SMS text 151 as the user identifier and cross-reference the phone number with service requester profiles 144 in the database 140. When a requester 174 issues a service request 171 with no connection to the network 160, the service requester application 175 can present the requester 174 with a confirmation screen to use SMS texts 151 as an alternative method of arranging for service.

In one implementation, the service requester application 175 has access to send and receive SMS text messages on service requester device 170 or has text messaging capabilities using the requester device 170 resources. When a requester 174 confirms the service request 171, the service requester application 175 creates and/or populates an SMS text 151 with the necessary information, such as the user's service location, service type, and parameters based on the service type (e.g., a destination for a transportation service). The requester application 175 can then send the SMS text 151 on the user's behalf to a limited connectivity interface 150 on the network computer system 100 over the SMS network. In such an implementation, once the requester 174 confirms the service request 171, the requester application 175 can generate and send the SMS text 151 without further input from the requester 174. Still further, the SMS text 151 can be sent to one or more designated identifiers (e.g., phone number, email address, link, etc.) associated with the network computer system 100 or the limited connectivity interface 150 so that the service request 171 can be processed by the network computer system 150.

In an alternate implementation, the service requester application 175 does not have direct access to send and receive SMS text messages on the service requester device 170. In such an implementation, the service requester application 175 can open or access a messaging application (e.g., capable of sending an SMS text) on the service requester device 170 (e.g., by communicating with the messaging or phone application of the requester device 170 via an application programming interface) to generate and/or populate the message with the appropriate content. The SMS text 151 can be addressed to an identifier or phone number corresponding to the limited connectivity interface 150. When the requester 174 presses a send button from the messaging application, the service requester device 170 sends the SMS text 151 to the limited connectivity interface 150 on the network computer system 100 over the SMS network. Alternatively, the service requester application 175 does not open the messaging application, but uses the functionality of the messaging application in the background. In such an example, when the requester 174 confirms the service request 171 from the service requester application 175, the service requester application 175 causes the messaging application to send the SMS text 151 to the limited connectivity interface 150 in the background, so that the requester's experience is seamless from his or her perspective.

In some examples, the limited connectivity interface 150 operates as a component of the network computer system 100 and converts SMS texts 151 containing service requests 171, user inputs 179, and other data from service requester application 175 into a format that the standard service requester interface 125 expects. In other examples, the limited connectivity interface 150 can contain similar logic as the standard service requester interface 125 and communicate directly with other components of the network computer system 100, such as the selection engine 130 and content engine 120.

Once the network computer system 100 processes the service request 171, updates such as ETA data 164 and confirmations 134 are sent back to the service requester device 170 through SMS texts 151. If service requester application 175 has access to read and process incoming SMS texts 151, the service requester application 175 can parse the SMS texts 151 to extract application data and update elements of the user interface accordingly. In such examples, by taking the textual data from the SMS texts 151 and incorporating them into the user interface of the service request application 175, the service data can be provided to the requester 174 in a manner that mimics the default mode of operation (so that the experience of the requester 174 would be enhanced despite the service request application 175 operating in a limited network connectivity mode). If service requester application 175 does not have access to read incoming SMS, the SMS texts 151 can be displayed to the requester 174 in a human-readable format (e.g., as a native pop-up dialog notification, in the messaging application, or in the service requester application 175, etc.). For example, network computer system 100 can send a text containing the message "Your driver John is en route to 24 Main St. and will arrive in 6 minutes." In other examples, multiple SMS texts 151 can be sent in sequence and/or periodically to update the dynamically changing data (e.g., a first text can be sent to identify the service provider along with vehicle type and/or a license number, a second and subsequent text can be sent periodically to update the estimated time of arrival, another text can be sent when the service provider is within a predefined distance of the start location or requester's location, etc.).

Figure 2:
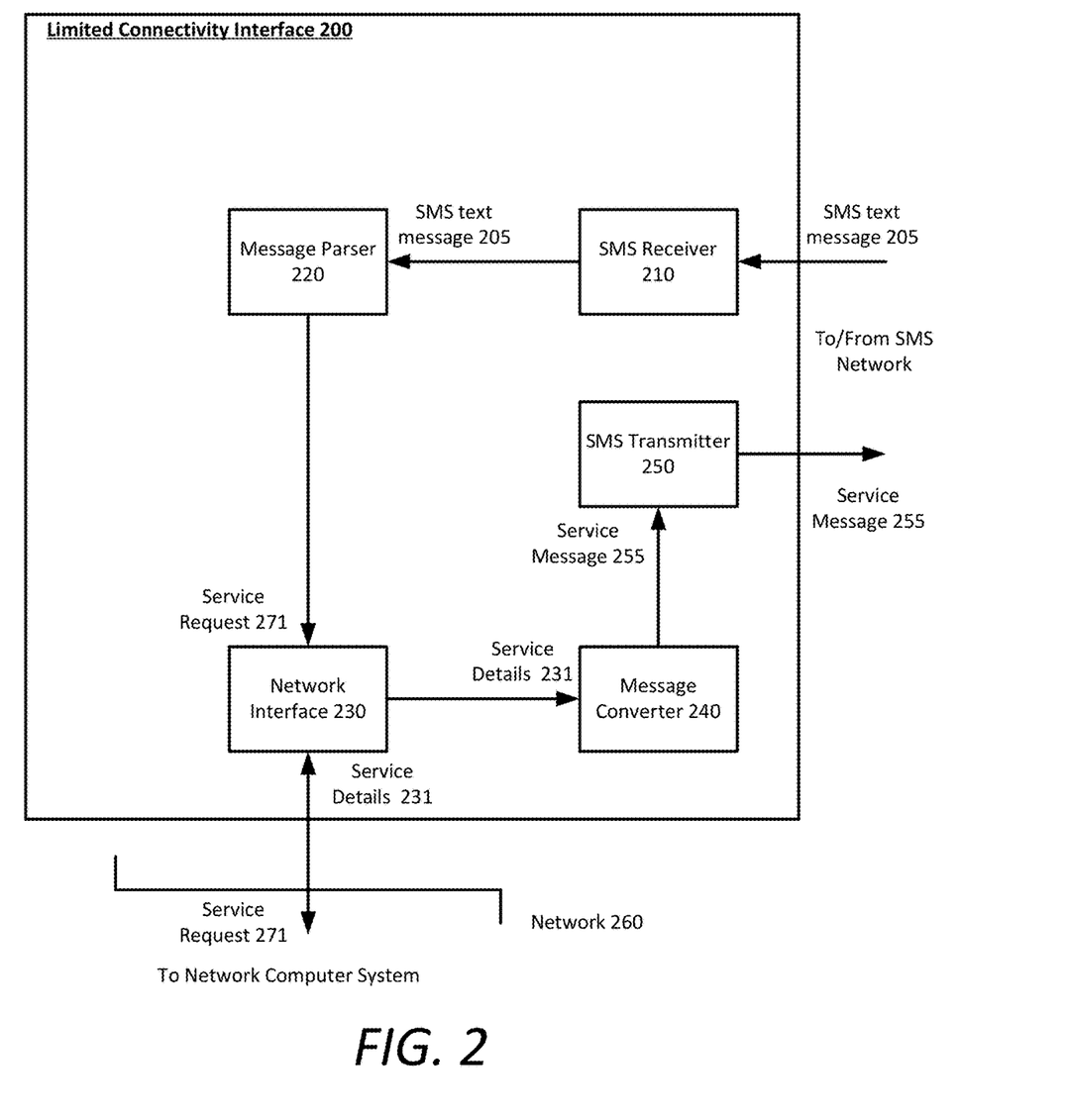
FIG. 2 is a block diagram illustrating an example limited network connectivity system in communication with service requester devices, in accordance with examples described herein.

FIG. 2 is a block diagram illustrating an example limited network connectivity interface 200 in communication with service requester devices, in accordance with examples described herein. In some examples, limited connectivity interface 200 corresponds to the limited connectivity interface 150 described with respect to FIG. 1.

SMS receiver 210 operates as a receiving point for SMS text messages 205 sent to one or more phone numbers or other SMS-compatible addressing schemes configured to connect to the network computer system 100. In some aspects, service requester application 175 saves a list of phone numbers that it can use to contact the SMS receiver 210 when there is no data connectivity to the Internet. This list of phone numbers can be organized by location, area codes, and other features so that service requester application 175 can choose an appropriate number to use to contact network computer system 100. In addition, service requester application 175 can receive updates to these phone numbers through the limited connectivity interface 200, through the Internet, or through application updates to the service requester application 175 itself.

SMS text messages 205 are sent to a message parser 220 that extracts details such as the service location, service type, and additional parameters (e.g., a destination for a transport request) according to a predetermined message format. The user's location and destination can be sent as plain text addresses, GPS coordinates, or other formats that reduce the amount of text characters required. Service type and other details can be expressed in human-readable formats or numerical identifiers depending on the necessity of being able to read the text messages and message length restrictions (i.e., 160 characters for SMS). In some examples, service requester application 175 can break long SMS text messages 205 into multiple messages that each contains part of a user input or request. In some aspects, message parser 220 can check the SMS text message 205 for proper authentication and security information such as a security key, password, checksum, or other feature to prevent spam or spoofing messages.

When receiving a request for service from a user over SMS, the message parser 220 can convert the SMS text message 205 into a service request 271 that is compatible with interfaces on the network computer system 100. In some examples, a network interface 230 on the limited connectivity interface 200 can send the service request 271 over a network 260, which can be the Internet or a local area network.

The network computer system 100 can also communicate back to the user device through the limited connectivity interface 200. In some aspects, once the network computer system 100 has arranged for a ride for the user, it sends service details 231 to the network interface 230 on the limited connectivity interface 200. A message converter 240 can read the service details 231 and generate an SMS service message 255 in a format that the user device 170 is programmed to interpret. SMS transmitter 250 can then send the service message 255 over the SMS network to the phone number associated with the user's account who requested the service.

Methodology

Figure 3:
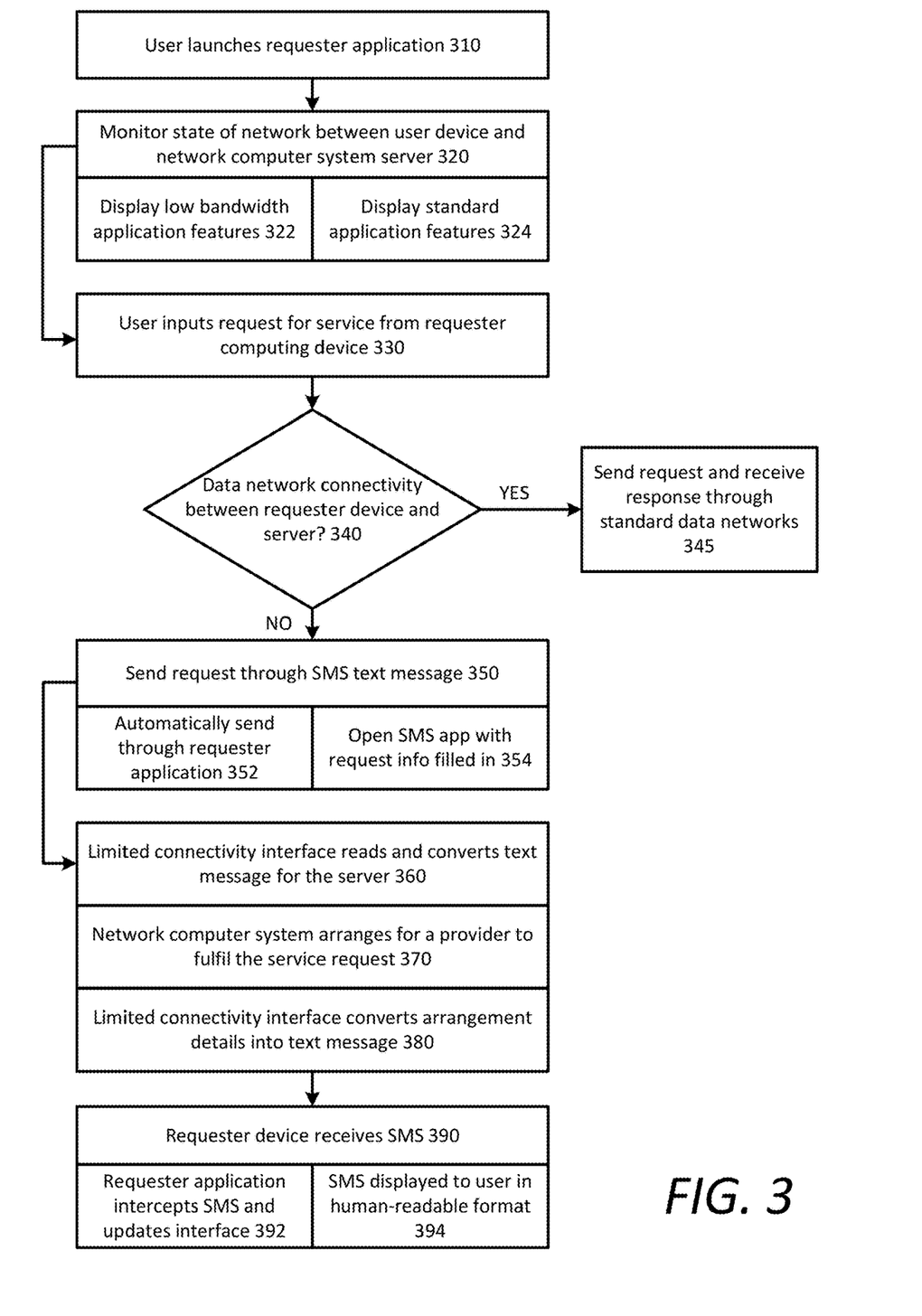
FIG. 3 is a flow chart describing an example method of providing a network-based service over limited network connectivity, according to examples described herein.

FIG. 3 is a flow chart describing an example method of providing network-based service over limited network connectivity, according to examples described herein. While operations of the method are described below as being performed by specific components of the network computer system 100, it will be appreciated that these operations need not necessarily be performed by the specific components identified, and could be performed by a variety of components and modules, potentially distributed over a number of machines. Accordingly, references may be made to elements of network computer system 100 for the purpose of illustrating suitable components or elements for performing a step or sub step being described. Alternatively, at least certain ones of the variety of components and modules described in network computer system 100 can be arranged within a single hardware, software, or firmware component. It will also be appreciated that some of the steps of this method may be performed in parallel or in a different order than illustrated.

With reference to an example of FIG. 3, a requester 174 launches a service requester application 175 on a device, which attempts to contact a network computer system 100 as described with FIG. 1 (310). While it executes, the service requester application 175 can monitor the state of the network between the user device 170 and the network computer system 100 (320). In some aspects, the service requester application 175 on service requester device 170 can degrade visual features of the user interfaces upon detecting that data throughput over network 160 is insufficient to provide the necessary data to the service requester device 170 in a timely manner (322). For example, updating detailed map data 137 can require sending large amounts of data through network 160 from the standard service requester interface 125 to the service requester device 170. If the connection to network 160 does not support sufficient bandwidth, service requester application 175 can present important information such as ETA data 164 and confirmations 134 on user interfaces with low fidelity map tiles or blank maps. During normal operation, service requester application 175 can monitor network conditions over network 160 and switch between a regular high-bandwidth mode and the low-bandwidth alternative in response to changes in network connectivity and measured throughput (324).

When a user requests a service through the service requester application 175, the service requester application 175 can test the state of the network connection between the user device 170 and the service facilitation server 100 (340). In functional network conditions, the service requester application 175 sends the request through standard data networks (e.g., over the Internet using cellular data or Wi-Fi) (345). In situations where service requester device 170 has no connection to network 160 or network conditions are unreliable, service requester application 175 can send service requests 171 using an alternate communications channel such as the short message system (SMS). SMS texts 151 are sent from the service requester device 170 to a limited connectivity interface 150 as part of the network computer system 100 (350). These text messages can include similar information as would normally be sent over network 160 to the standard service requester interface 125. In one example, a service request 171 from an individual requester 174 can specify a user identifier (ID) and a service location 173. In some variations, the service request 171 specifies a vehicle type (or alternatively, a service type), and/or a destination location. The service location 173 can correspond to, for example, the current location of the service requester device 170 (e.g., as a default setting), a future location of service requester device 170, and/or a location specified by manual input from the requester 174. In some examples, limited connectivity interface 150 can treat the phone number of a received SMS text 151 as the user identifier and cross-reference the phone number with service requester profiles 144 in the database 140. When a requester 174 issues a service request 171 with no connection to network 160, service requester application 175 can present the requester 174 with a confirmation screen to use SMS texts 151 as an alternative method of arranging for service.

In one implementation, service requester application 175 has direct access to send and receive SMS text messages on service requester device 170. When a requester 174 confirms the service request 171, service requester application 175 creates an SMS text 151 with the necessary information, such as the user's service location, destination, and service type. Requester application 175 can then send the SMS text 151 on the user's behalf to a limited connectivity interface 150 on the network computer system 100 over the SMS network (352).

In an alternate implementation, service requester application 175 does not have direct access to send and receive SMS text messages on service requester device 170. After creating a message with the necessary information, the service requester application 175 can open an SMS text application on the service requester device 170 with the message and phone number corresponding to the limited connectivity interface 150 pre-populated. When the requester 174 presses a send button, the service requester device 170 sends the SMS text 151 to the limited connectivity interface 150 on the network computer system 100 over the SMS network (354).

In some examples, the limited connectivity interface 150 operates as a component of the network computer system 100 and converts SMS texts 151 containing service requests 171, user inputs 179, and other data from service requester application 175 into a format that the standard service requester interface 125 expects (360). In other examples, the limited connectivity interface 150 can contain similar logic as the standard service requester interface 125 and communicate directly with other components of the network computer system 100, such as the selection engine 130 and content engine 120.

Once the network computer system 100 processes the service request 171, it arranges for a service provider to pick up the requester 174 (370). Updates such as ETA data 164 and confirmations 134 are then sent back to the service requester device 170 through SMS texts 151 that the limited connectivity interface 150 generates (380). User device 170 receives the texts through the SMS network at the phone number associated with the user's account (390). If service requester application 175 has access to read incoming SMS, service requester application 175 can parse the SMS texts 151 to extract application data and update elements of the user interface accordingly (392). If service requester application 175 does not have access to read incoming SMS, the SMS texts 151 can be displayed to the requester 174 in a human-readable format (394).

User Interface Examples

FIGS. 4A-4D illustrate example user interfaces on a service requester device, according to examples described herein. Application interface 410 displays a simple linear representation of a trip when detailed map information is unavailable due to limited or no data connectivity. In some examples, estimated time to arrival, service, and pricing details are retrieved from cached historical information on the user device. When a user presses the "request" button, the application interface 410 can transition to an SMS confirmation screen 420 to inform the user that the network computer system cannot be reached but that the user can still request a ride via SMS.

Figure 4A:
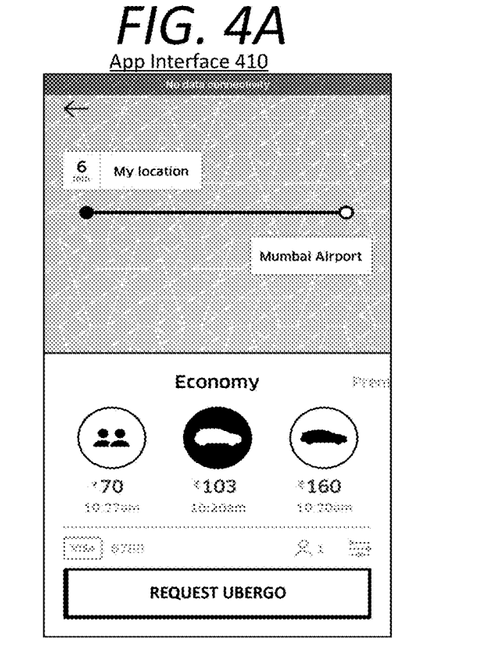
FIGS. 4A-4D illustrate example user interfaces on a service requester device, according to examples described herein.
Figure 4B:
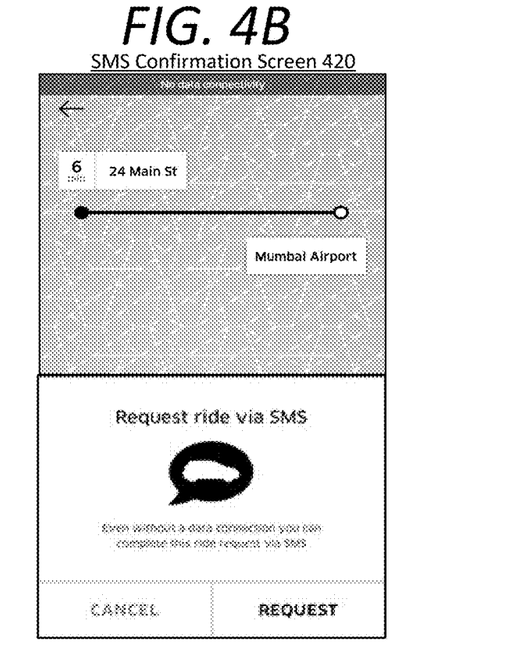

If the user confirms their intent to use the SMS request feature, the service requester application transmits necessary details such as the user's location (24 Main St.), their intended destination (Mumbai Airport), and the type of service over the SMS network to a phone number or other SMS-compatible address.

Figure 4C:
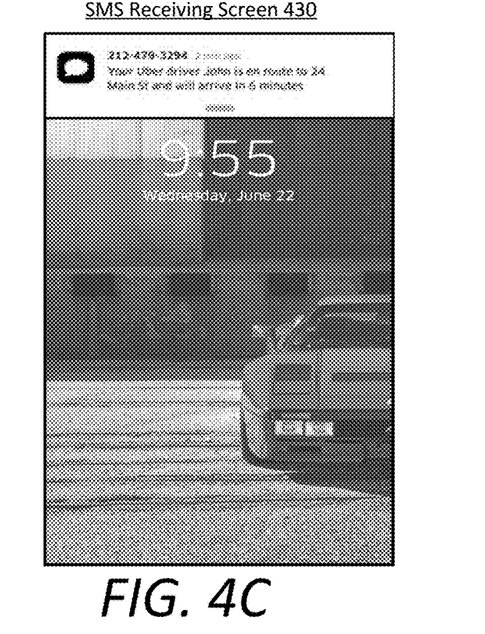
Figure 4D:
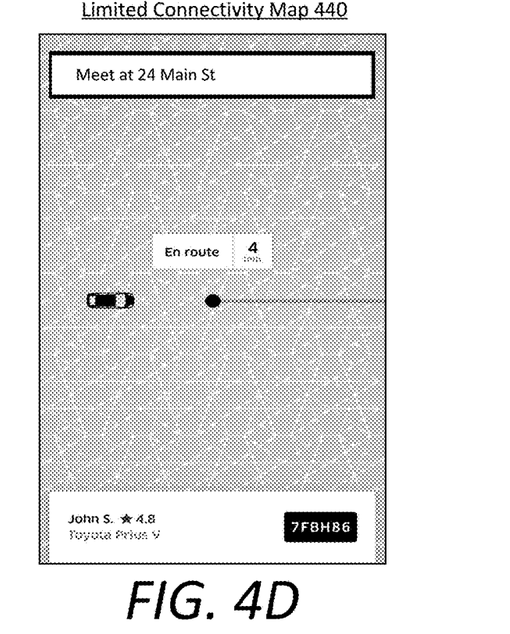

SMS receiving screen 430 shows an example text message received at the user device after the network computer system arranges for a service provider to service the user. In examples where the service requester application can read received SMS texts, the service requester application can parse and display relevant information from text messages on a limited connectivity map 440. For example, the service requester application can parse a service provider's name, rating, car, license plate number, service location, and estimated time to arrival from text messages and populate the appropriate user interface elements. While the service provider is en route and during the trip, the network computer system can continue to send text messages to the service requester device at critical points and periodically to update the limited connectivity map 440.

Service Requester Device

Figure 5:
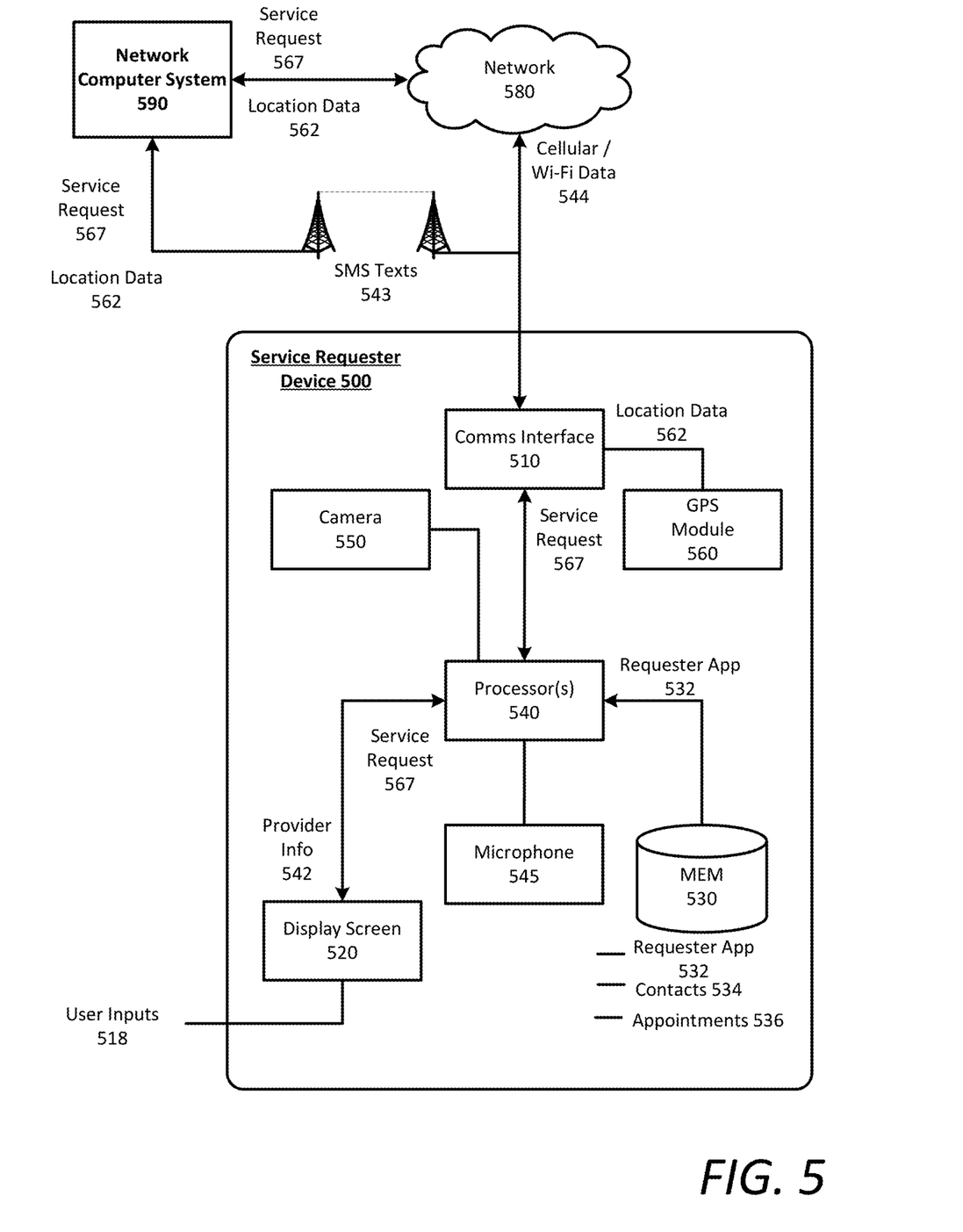
FIG. 5 is a block diagram illustrating an example service requester device executing a designated service requester application for an on-demand service, as described herein.

FIG. 5 is a block diagram illustrating an example service requester device executing a designated service requester application for an on-demand service, as described herein. In many implementations, the service requester device 500 can comprise a mobile computing device, such as a smartphone, tablet computer, laptop computer, VR or AR headset device, and the like. As such, the service requester device 500 can include typical telephony features such as a microphone 545, a camera 550, and a communication interface 510 to communicate with external entities using any number of wireless communication protocols. In certain aspects, the service requester device 500 can store a designated application (e.g., a service requester app 532) in a local memory 530. In many aspects, the service requester device 500 further store information corresponding to a contacts list 534, and calendar appointments 536 in the local memory 530. In variations, the memory 530 can store additional applications executable by one or more processors 540 of the service requester device 500, enabling access and interaction with one or more host servers over one or more networks 580.

In response to a user input 518, the service requester app 532 can be executed by a processor 540, which can cause an app interface to be generated on a display screen 520 of the service requester device 500. The app interface can enable the user to, for example, check current price levels and availability for the service arrangement service. In various implementations, the app interface can further enable the user to select from multiple ride service types, such as a carpooling service type, a regular ride-sharing service type, a professional ride service type, a van network-based service type, a luxurious ride service type, and the like.

The user can generate a service request 567 via user inputs 518 provided on the app interface. For example, the user can select a service location, view the various service types and estimated pricing, and select a particular service for service to an inputted destination. In many examples, the user can input the destination prior to service. In addition, the service requester app 532 can generate a service request 567 when executed assuming that certain conditions are satisfied (i.e., the network computer system 590 determines that the service requester is likely to request a service). As provided herein, the service requester application 532 can further enable a communication link with a network computer system 590 over the network 580, such as the network computer system 100 as shown and described with respect to FIG. 1. Furthermore, as discussed herein, the service requester application 532 can display service provider info 542 on the app interface, including service provider info 542 for a likely service provider, a selected service provider, or a matching screen while the network computer system 590 attempts to select an optimal service provider.

The processor 540 can transmit the service requests 567 via a communications interface 510 to the backend network computer system 590 over a network 580 using cellular or Wi-Fi data 544. In response, the service requester device 500 can receive a confirmation from the network computer system 590 indicating the selected service provider and vehicle that will service the service request 567 and rendezvous with the user at the service location. In various examples, the service requester device 500 can further include a GPS module 560, which can provide location data 562 indicating the current location of the requesting user to the network computer system 590 to, for example, establish the service location and/or select an optimal service provider to fulfil the service request 567.

In some examples, the communications interface 510 can transmit the service request 567, location data 562, and other information through short message service (SMS) texts. Similarly, communications interface 510 can receive information from the backend network computer system 590 over text messages as described with respect to FIGS. 1-4.

In alternative aspects, hard-wired circuitry may be used in place of or in combination with software instructions to implement aspects described herein. Thus, aspects described are not limited to any specific combination of hardware circuitry and software.

Hardware Diagram

Figure 6:
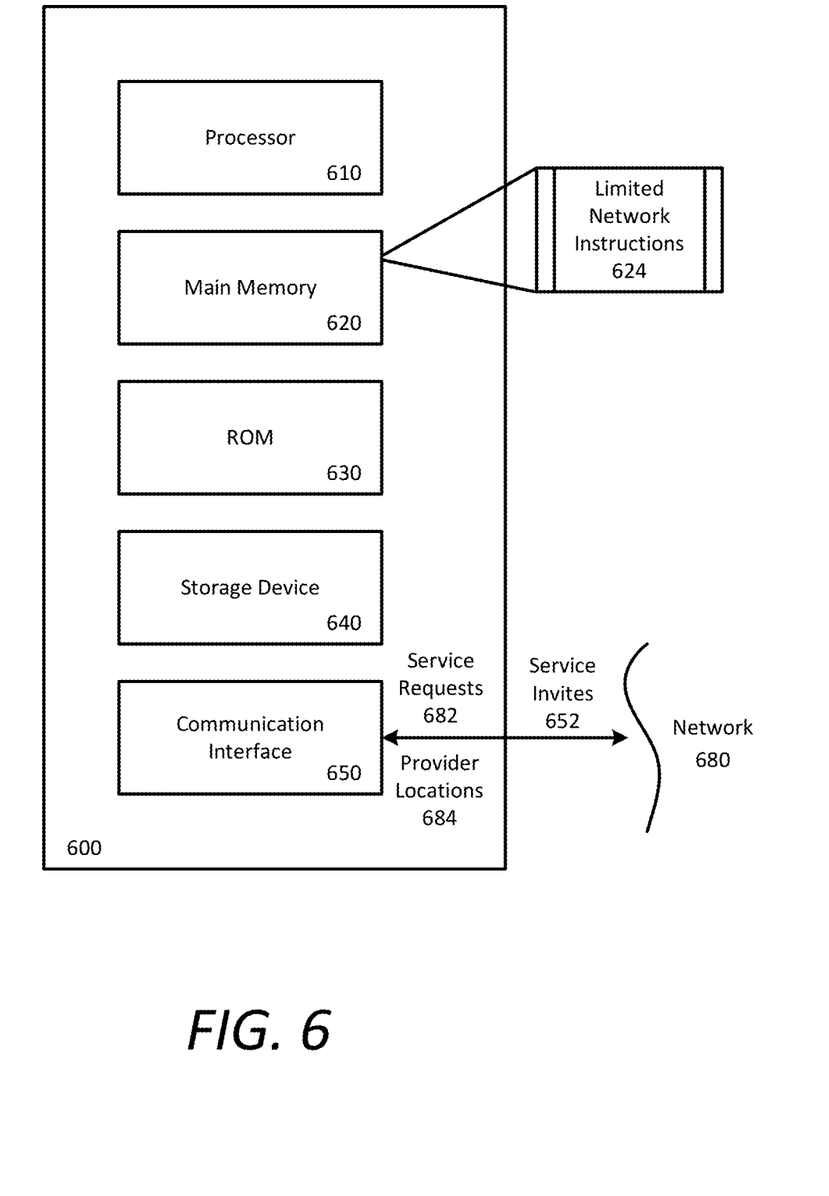
FIG. 6 is a block diagram that illustrates a computer system upon which aspects described herein may be implemented.

FIG. 6 is a block diagram that illustrates a computer system upon which examples described herein may be implemented. A computer system 600 can be implemented on, for example, a server or combination of servers. For example, the computer system 600 may be implemented as part of a network service for providing services. In the context of FIG. 1, the network computer system 600 may be implemented using a computer system 600 such as described by FIG. 6. The network computer system 100 may also be implemented using a combination of multiple computer systems as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., cellular network) through use of the network link (wireless or wired). Using the network link, the computer system 600 can communicate with one or more computing devices, one or more servers, and/or one or more self-driving vehicles. In accordance with examples, the computer system 600 receives service requests 682 from mobile computing devices of individual users. The executable instructions stored in the memory 630 can include limited network instructions 624, which the processor 610 executes to determine whether to send service requests through regular data channels or SMS text messages and whether to display limited network interfaces within the service requester application.

By way of example, the instructions and data stored in the memory 620 can be executed by the processor 610 to implement an example network computer system 100 of FIG. 1. In performing the operations, the processor 610 can receive service requests 682 and service provider locations 684, and submit service invitations 652 to facilitate the servicing of the requests 682.

The processor 610 is configured with software and/or other logic to perform one or more processes, steps and other functions described with implementations, such as described by FIGS. 1-4, and elsewhere in the present application.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A method for controlling a data transmission for a network-based service, the method being performed by one or more processors and comprising:

detecting, through a user interface of a requester application executing on a computing device of a requester, user input corresponding to a request for service; and in response to detecting that the computing device of the requester has insufficient network connectivity to transmit the request for service to a server over a default data communications channel:

(i) using the requester application to generate the request for service and location information associated with the request for service in a text message format that is suitable for an alternate communications channel, as opposed to a default format that is suitable for the default data communications channel, wherein the alternate communications channel is different than the default data communications channel and the text message format is different than the default format, and (ii) transmitting the request for service in the text message format to the server via the alternate communications channel.

2. The method of claim 1, further comprising:
receiving one or more text messages associated with the service from the server over the alternate communications channel.

3. The method of claim 2, further comprising:
subsequent to transmitting the request for service in the text message format to the server via the alternate communications channel, automatically receiving the one or more text messages from the server over the alternate communications channel until an occurrence of a specified event.

4. The method of claim 2, wherein the text message format has a predetermined format, the method further comprising:
based on the predetermined format, parsing the received one or more text messages to convert service details into a format compatible with the requester application.

5. The method of claim 4, wherein the service details include service provider information and an estimated time to arrival for a service provider.

6. The method of claim 4, further comprising:
displaying the service details on the user interface of the requester application.

7. The method of claim 1, wherein the alternate communications channel uses short message service (SMS) protocol.

8. The method of claim 1, wherein the requester application operates in a limited network connectivity mode in response to detecting that the computing device has insufficient network connectivity, wherein in the limited network connectivity mode, the requester application presents the user interface in a low fidelity format.

9. The method of claim 1, wherein the requester application operates in a limited network connectivity mode in response to detecting that the computing device has insufficient network connectivity, wherein in the limited network connectivity mode, the requester application caches map data on the computing device and displays map content using the cached map data.

10. The method of claim 1, wherein the computing device transmits the request for service in the text message format to the server via the alternate communications channel in response to receiving the user input on the requester application.

11. The method of claim 1, wherein the requester application launches a separate application to communicate over the alternate communications channel and populates a message window in the separate application with at least the request for service and the location information in the text message format to send on behalf of the requester application, the text message format having a predetermined format.

12. A computing device comprising:
one or more processors; and
one or more memory resources storing instructions that, when executed by the one or more processors, cause the one or more processors to:
detect, through a user interface of a requester application executing on the computing device, user input corresponding to a request for service; and
in response to detecting that the computing device has insufficient network connectivity to transmit the request for service to a server over a default data communications channel:

(i) use the requester application to generate the request for service and location information associated with the request for service in a text message format that is suitable for an alternate communications channel, as opposed to a default format that is suitable for the default data communications channel, wherein the alternate communications channel is different than the default data communications channel and the text message format is different than the default format, and (ii) transmit the request for service in the text message format to the server via the alternate communications channel.

13. The computing device of claim 12, further comprising instructions for:
receiving one or more text messages associated with the service from the server over the alternate communications channel.

14. The computing device of claim 13, further comprising instructions for:
generating the request for service and location information associated with the request for service in a text message format having a predetermined format; and
based on the predetermined format, parsing the received one or more text messages to convert service details into a format compatible with the requester application.

15. The computing device of claim 14, wherein the service details include service provider information and an estimated time to arrival for a service provider.

16. The computing device of claim 14, further comprising instructions for:
displaying the service details on the user interface of the requester application.

17. The computing device of claim 12, wherein the alternate communications channel uses short message service (SMS) protocol.

18. The computing device of claim 12, wherein the requester application operates in a limited network connectivity mode in response to detecting that the computing device has insufficient network connectivity, wherein in the limited network connectivity mode, the requester application presents the user interface in a low fidelity format.

19. The computing device of claim 12, wherein the requester application operates in a limited network connectivity mode in response to detecting that the computing device has insufficient network connectivity, wherein in the limited network connectivity mode, the requester application caches map data on the computing device and displays map content using the cached map data.

20. A non-transitory computer readable medium storing instructions that, when executed by one or more processors of a computing device, cause the one or more processors to:
- detect, through a user interface of a requester application executing on the computing device, user input corresponding to a request for service; and
- in response to detecting that the computing device has insufficient network connectivity to transmit the request for service to a server over a default data communications channel:
  - (i) use the requester application to generate the request for service and location information associated with the request for service in a text message format that is suitable for an alternate communications channel, as opposed to a default format that is suitable for the default data communications channel, wherein the alternate communications channel is different than the default data communications channel and the text message format is different than the default format, and
  - (ii) transmit the request for service in the text message format to the server via the alternate communications channel.

\* \* \* \* \*